Sept. 13, 1955     D. G. REMPEL ET AL     2,717,849
METHOD AND APPARATUS FOR MAKING
COMPARTMENTED TUBULAR DEVICES
Filed April 30, 1953     5 Sheets-Sheet 1
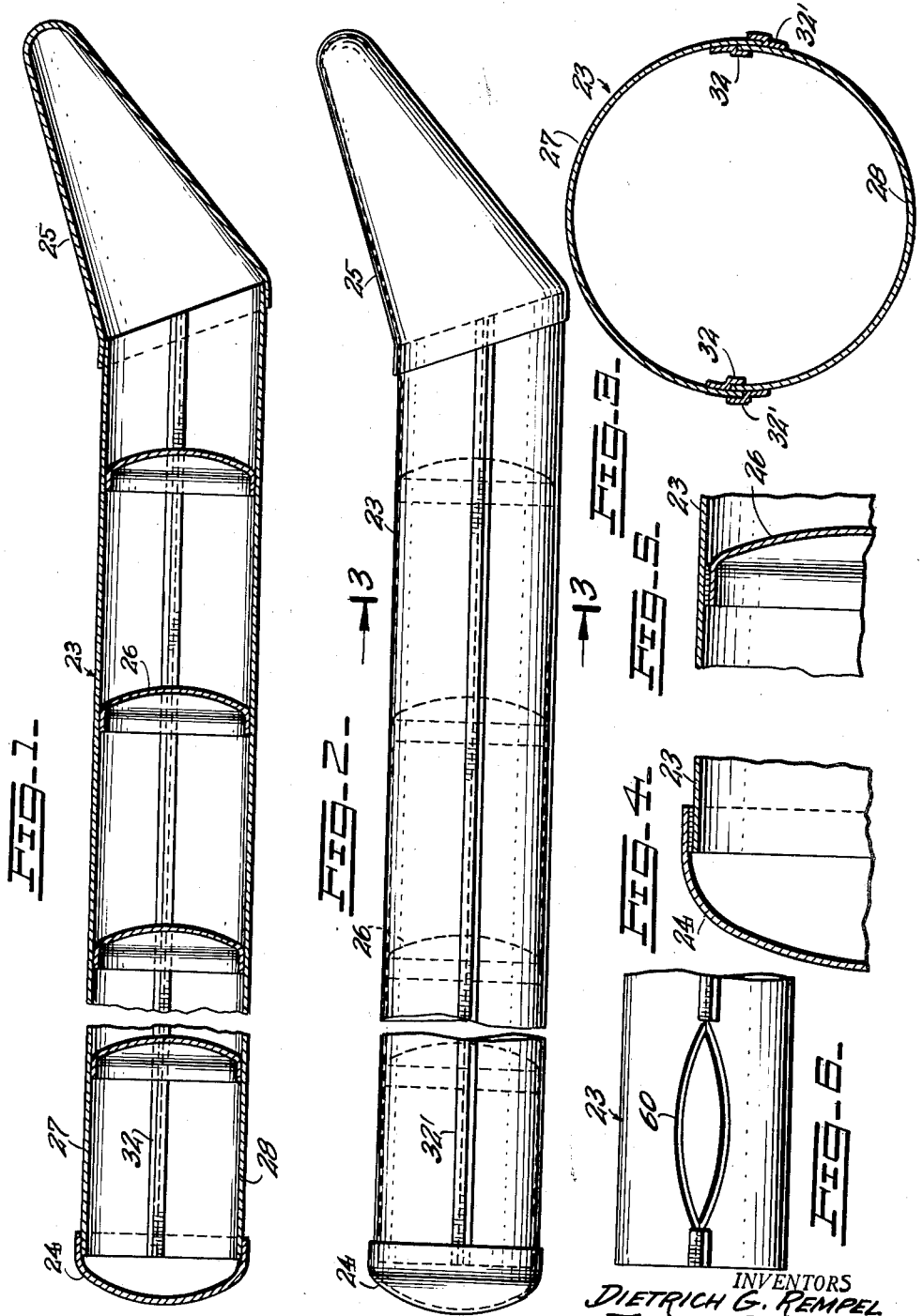
INVENTORS
DIETRICH G. REMPEL
FRANK R. CARILLON
BY
Pennie Edmonds Morton Barrows & Taylor
ATTORNEYS

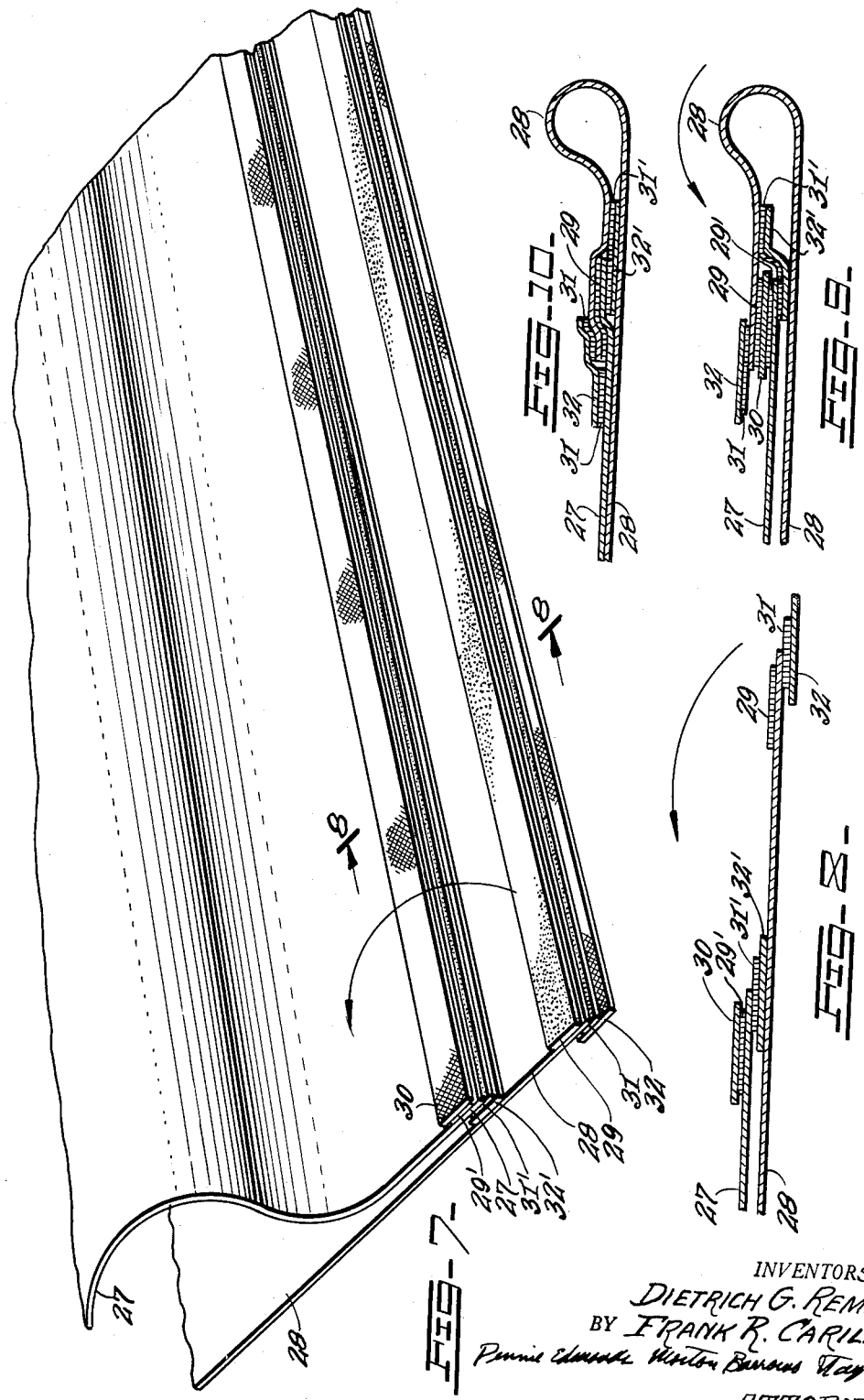

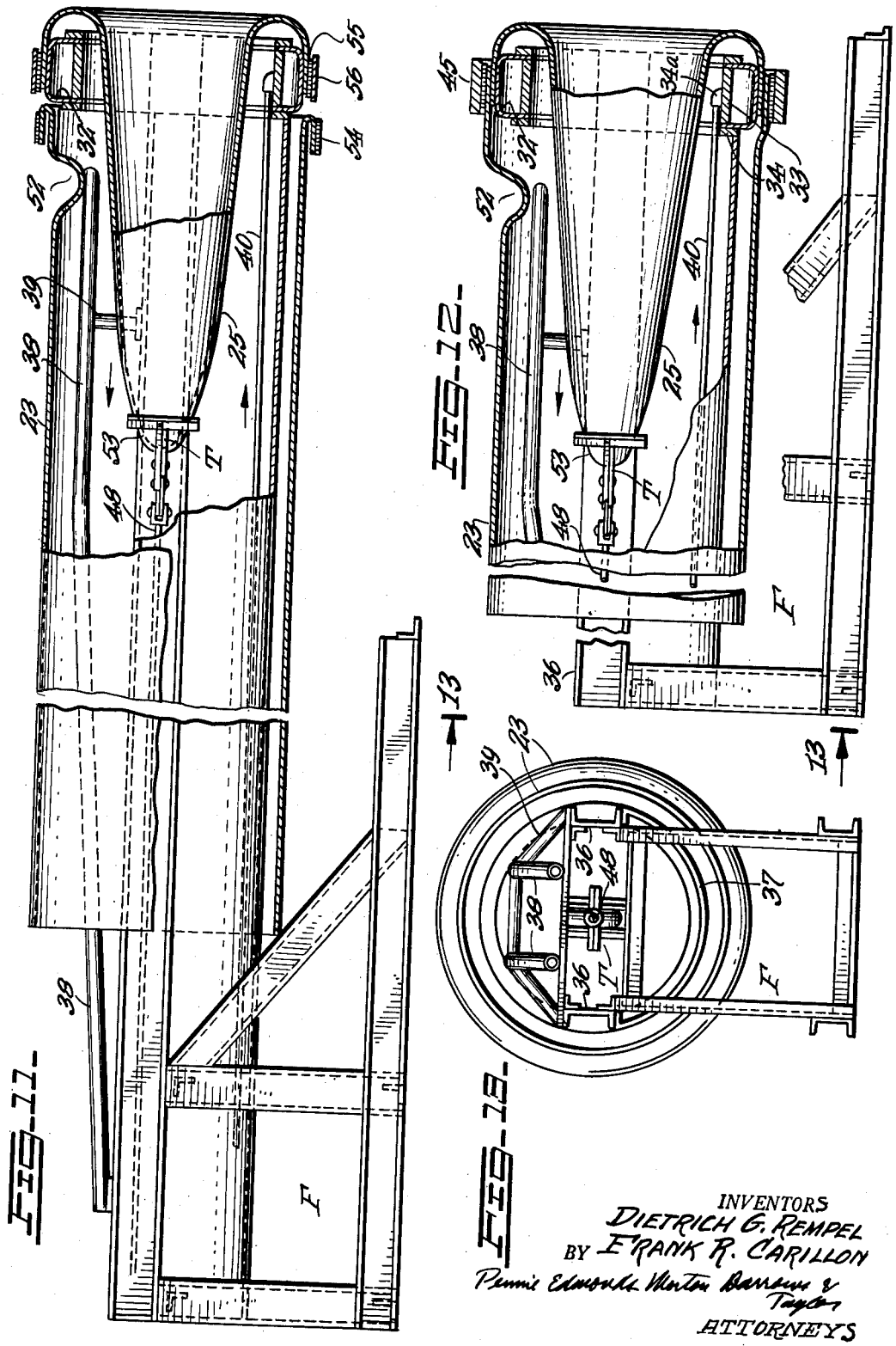

Sept. 13, 1955
D. G. REMPEL ET AL
2,717,849
METHOD AND APPARATUS FOR MAKING
COMPARTMENTED TUBULAR DEVICES
Filed April 30, 1953
5 Sheets-Sheet 4
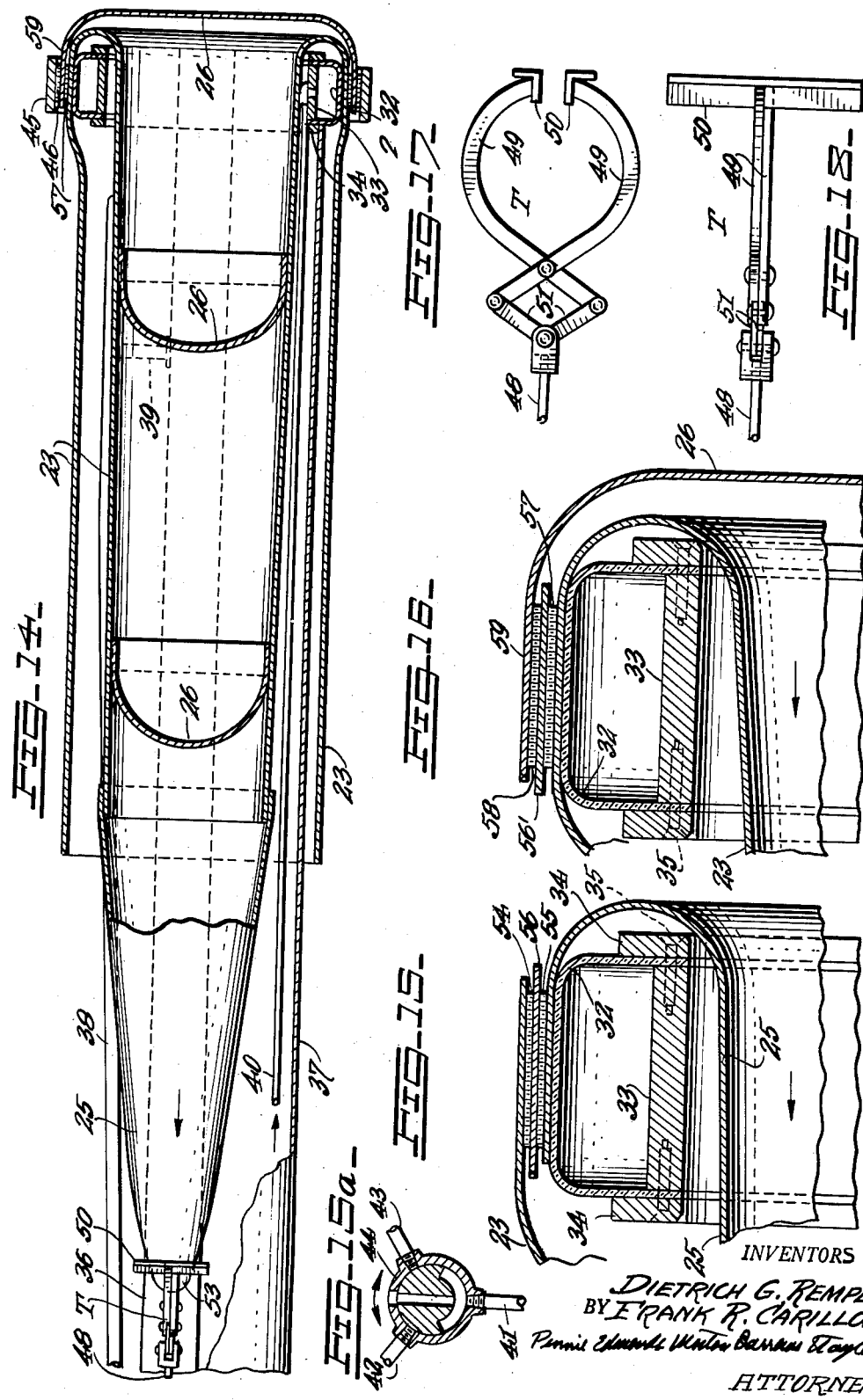
INVENTORS
DIETRICH G. REMPEL
BY FRANK R. CARILLON
Pennie Edmonds Morton Barrows Taylor
ATTORNEYS

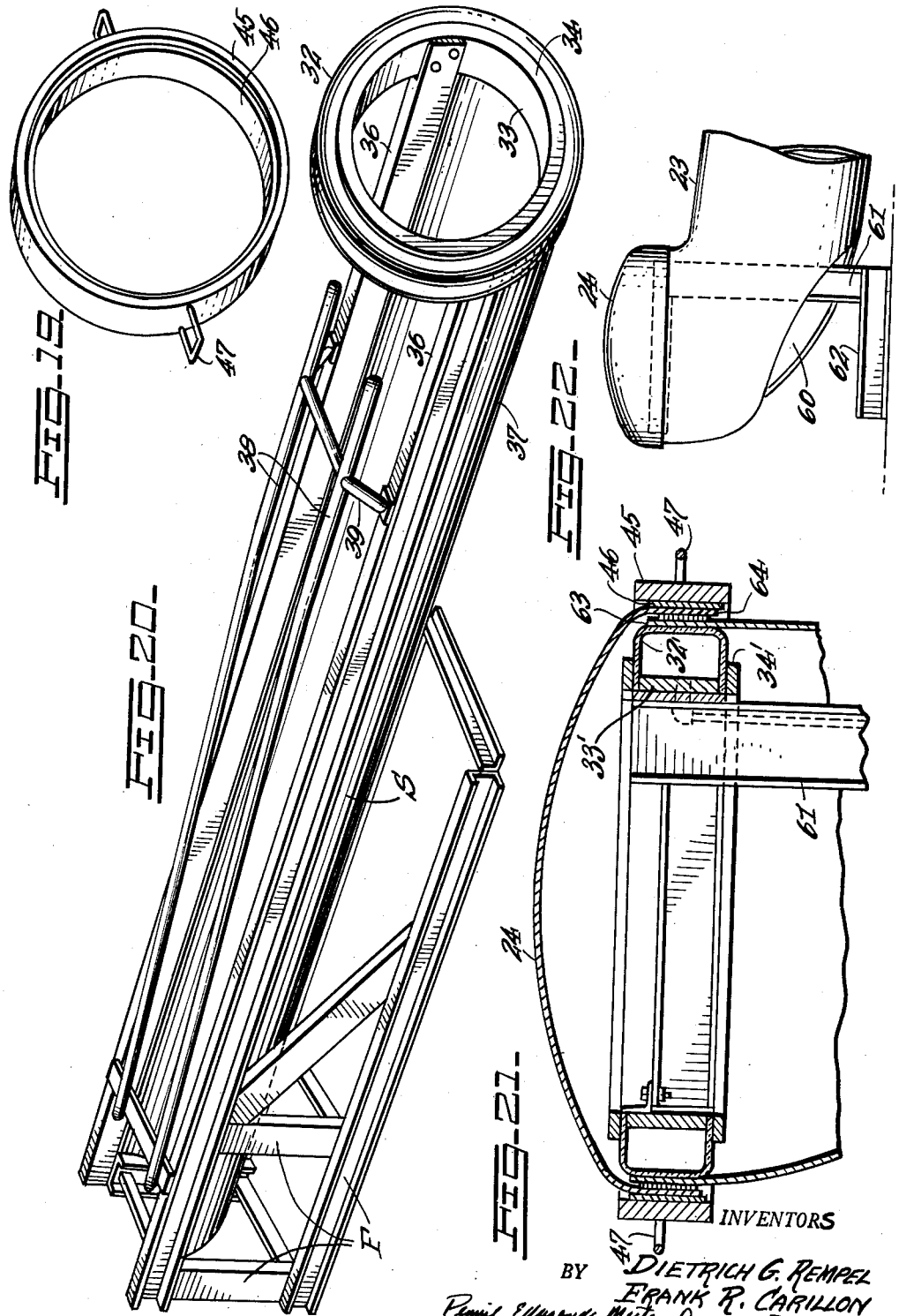

United States Patent Office 2,717,849
Patented Sept. 13, 1955

2,717,849

METHOD AND APPARATUS FOR MAKING COMPARTMENTED TUBULAR DEVICES

Dietrich G. Rempel and Frank R. Carillon, Akron, Ohio, assignors to Rempel Manufacturing, Inc., Akron, Ohio, a corporation of Ohio Application April 30, 1953, Serial No. 352,112

11 Claims. (Cl. 154—83)

This invention relates to a method for making compartmented tubular devices, and more particularly concerns a method for securing air and water-tight bulkheads or partitions and ends to a tubular body of flexible material, such as that employed to form a pontoon or other float, which in use is inflated with air under pressure. The invention also includes improved apparatus by means of which the method of the invention may be carried out. In a typical embodiment, the invention may be employed in the manufacture of pontoons of the type used to support bridges across bodies of water. Modern pontoons are generally elongated substantially cylindrical objects formed of flexible water-tight material usually comprising heavy fabric impregnated and coated with natural or synthetic rubber. They are inflated with air under pressure, and to insure dependable service, particularly in military operations, they are divided into water and airtight compartments so that a leak or puncture at one point will not deflate the entire pontoon. Because of the relatively high internal air pressures employed, the seams by which the bulkheads or partitions are secured to the tubular member and the seams of the tubular member are likely to develop leaks from the inside edges of the seams and due to the relatively long and narrow configuration of the pontoon tubes, tight joints at the inner seam edges are difficult to achieve.

The present invention has for its major object the provision of an improved method for making or assembling hollow flexible objects, and particularly tubular objects that are divided into compartments by partitions or bulkheads. More specifically, the method of the invention comprises a series of steps by which the seams joining the bulkheads and other parts to the tubular body, as well as seams of the tubular body, are formed with the inner edges of the joint parts outermost, where the seam forming operations can be accurately and effectively performed, with the result that secure water and air-tight seams are produced. A further object of the invention is the provision of improved apparatus by which the method of the invention may be effectively carried out.

In describing the invention in detail, reference will be made to the accompanying drawing, in which our improved apparatus and the steps of our improved method have been illustrated.

In the drawings:

Fig. 1 is a sectional elevation of a pontoon which may be made by the method and with the aid of the apparatus of the invention;

Fig. 2 is an outside elevation of the pontoon of Fig. 1;

Fig. 3 is an enlarged sectional view taken along the line 3—3 of Fig. 2;

Fig. 4 is an enlarged sectional view of the seam by which the stern part is secured to the tubular body;

Fig. 5 is an enlarged sectional view of the seam by which a transverse partition or bulkhead is secured within the tubular body;

Fig. 6 is an elevation showing an open portion of one of the tubular body seams;

Fig. 7 is a perspective view illustrating the method of forming one of the seams of the tubular body;

Fig. 8 is a sectional view taken along the line 8—8 of Fig. 7;

Fig. 9 is a sectional view through one of the tubular body seams before the parts are pressed together;

Fig. 10 is a sectional view similar to Fig. 9 showing the parts after they have been pressed together;

Fig. 11 is a side elevation, partly in section, of a jig or apparatus for supporting a tubular body while the bow and bulkheads are being secured thereto and illustrating the preparation of the parts for the securing of a bow part to a tubular body;

Fig. 12 is a sectional elevation, similar to Fig. 11, showing another stage in the securing of the bow to the body;

Fig. 13 is an end elevation taken along the line 13—13 of Fig. 12;

Fig. 14 is a side elevation of the apparatus and a partly formed pontoon, illustrating the manner of attaching one of several successive bulkheads within the tubular body;

Fig. 15 is an enlarged sectional elevation of a portion of the apparatus, illustrating one step in the formation of a seam between the tubular body and the bow of a pontoon;

Fig. 15a is a diagrammatic illustration of a valve for selectively connecting an air bag to air at different pressures;

Fig. 16 is an enlarged sectional elevation of a portion of the apparatus, illustrating one step in the formation of a seam between the tubular body and a bulkhead;

Figs. 17 and 18 are, respectively, plan and side elevations of a pair of tongs employed in pulling the pontoon right side out during assembly;

Fig. 19 is a perspective view of a restraining ring forming a part of the apparatus;

Fig. 20 is a perspective view of the tubular body supporting apparatus embodying the invention;

Fig. 21 is a sectional elevation illustrating the securing of a stern part to the tubular body of a pontoon; and Fig. 22 is an elevation, on a smaller scale, illustrating the attachment of the pontoon stern.

There is illustrated in Figs. 1–5 a finished pontoon, here chosen as an example of a flexible compartmented tubular device to which the method of the invention is applicable. It comprises an elongated tubular body 23 having a stern part 24 at one end and a bow part 25 at the other. The body 23 is divided into compartments by transverse partitions or bulkheads 26, four of which are shown. The body, bow, stern and bulkheads are formed of flexible but relatively heavy fabric impregnated and coated with natural rubber or synthetic rubber, such as Neoprene, a material which is known for this purpose. Pontoons such as that illustrated here are customarily very long as compared to their cross-section, and a length of about 22 feet with a diameter of about 3 feet is typical.

The body portion 23 of the illustrated pontoon is formed of two parts, an upper part 27 and a lower part 28 as illustrated in Fig. 3. Although the body may be otherwise made, it is preferred that it be assembled in accordance with the procedure illustrated in Figs. 7 to 10, inclusive. The sheet of flexible rubberized material that will form the lower body part 28 is placed on a suitable flat table or the like with the surface that will become the outside of the finished pontoon body uppermost. The upper part 27 is placed on top of the lower part 28 with the surface that will form the inside of the finished pontoon body uppermost. The uppermost surface of each marginal side edge of the lower part 28 and of each marginal side edge of the upper part 27 is coated with a layer 29, 29' of rubber cement of known composition which is allowed to dry to a tacky consistency and one such layer, here shown as layer 29' on the upper part 27, is covered with a fabric liner 30. Fabric liners are known implements comprising strips of cloth suitably treated so that they will lightly adhere to but may be readily stripped from a surface coated with rubber cement without any substantial amount of the cement adhering to the stripped liner. Strips 31 and 31' of natural gum rubber covered by bands or tapes 32 and 32' of the rubberized fabric are, respectively, placed beneath and extend beyond each side edge of the lower part 28 and the upper part 27. Each side edge of the lower part 28 is folded over on top of the corresponding side edge of the upper part 27 in the direction of the arrows in Figs. 7 and 8, whereupon the relation of the parts is as shown in Fig. 9. The fabric liner 30 separates the layers of rubber cement 29 and 29' and permits the cemented marginal edge portions to be moved and worked to smooth and accurate overlapping relation. The liner 30 is then progressively pulled from between the facing layers of cement 29 and 29', and these layers are activated by swabbing them with a sponge or cloth saturated with the thinner or solvent of the cement. The swab is passed along the path between the cement layers as the liner is pulled out, and the overlapping marginal side edges of the lower part 28 are pressed firmly down on the underlying marginal side edges of the upper part with suitable means, such as hand operated tacking rollers of known construction, whereupon the overlapping edges of the parts assume the relative positions generally illustrated in Fig. 10. The gum rubber strips 31 and 31' spread out somewhat during this pressing operation and are later vulcanized along with the other joints of the pontoon in a subsequent operation with which the present invention is not concerned.

The seam forming operation at one side edge only of the parts 27 and 28 has been illustrated, it being understood that an identical operation is carried out at the opposite side edge. There is thus formed a tubular body 23 with the surface thereof which is to become the inside presented outwardly. Since the body is assembled while inside out, the seams are formed with the inner edges thereof exposed for careful and continuous sealing by the operators and the likelihood of leaks subsequently developed due to excess internal pressure in the finished device is minimized.

Although the body has been illustrated as being formed of but two parts 27 and 28, it is to be understood that these upper and lower parts may not be continuous throughout the length of the body but may instead be formed of several sheets suitably joined together at their ends.

According to the method of the invention, one or more transverse partitions or bulkheads 26 and, if desired, a bow part 25, are secured and sealed to the inside surface of the tubular body 23 while that surface is presented outwardly due to the fact that the body is inside out, and the tubular body is telescopically reversed through itself by drawing one end thereof axially back within and along the remainder thereof after each transverse partition or bulkhead has been secured to the outwardly presented inside body surface at a point adjacent the point of turn or reversal. The method may be employed to secure one transverse partition or bulkhead at an intermediate point in the body, or to secure a plurality of relatively spaced bulkheads to points along the body. After the last bulkhead is so secured, the reversal of the tubular body is completed, so that the entire body is turned right side out. Thereafter the stern or end cap may be secured to the last reversed end of the body. The transverse partitions or bulkheads are flexible and preferably of generally cup or hemispheroidal shape so that they present marginal cylindrical surfaces that may be drawn over the outwardly disposed inside surface of the tubular body adjacent the point of reversal, a layer of cement being disposed between the superimposed bulkhead and body surfaces. A liner strip may be interposed between the cement carrying surfaces to permit smooth and accurate placement of the bulkhead surfaces over the tubular body surface during assembly. The cement joint may be firmly sealed by radially expanding the tubular body outward against the surrounding cylindrical surface of the bulkhead which may be restrained against substantial radial expansion by suitable means, such as a surrounding ring. This expansion may be accomplished by the use of an annular air bag which, with its supporting rim, also serves as a turning ring over which the tubular body is progressively reversed within itself to a right side out condition.

In the drawings, we have illustrated one form of apparatus which may be employed to carry out our method. The apparatus essentially comprises an annular air bag 32 mounted on a ring-shaped rim formed of a flat ring 33 with side rings 34 secured thereto by suitable means, such as screws 35, the side edges of the air bag being clamped between the side rings 34 and the opposite edges of the flat ring 33 (Figs. 11, 15, 16 and 20). The flat ring 33 is supported at the free end of an elongated structure S having the general form of a trough and which is supported adjacent the end opposite from that at which the air bag is located by a frame F of a suitable construction which is apparent from the drawing (Figs. 11 and 20). The elongated structure S presents a free cantilever supported part of substantially the length of the tubular body 23 of the pontoon or other device to be assembled thereon.

In the disclosed embodiment, the structure S comprises two parallel flanged beams 36 and a U-section sheet metal trough 37 welded or otherwise secured along its upper edges to the respective beams, as shown in Fig. 13. Two rods 38 extend longitudinally along the structure S above the trough and are secured to and supported by transverse braces 39 and 39' welded to the beams 36 (Figs. 11, 13 and 20). An air hose 40 (Fig. 11) is connected to the interior of the air bag 32 through a fitting 34a secured to an opening through the flat ring or rim 33, and the hose extends through the trough 37 and out of the supported end thereof. The outer end of the hose 40 is arranged for selective connection to a source of low pressure compressed air, a source of high pressure compressed air, and a vent or source of vacuum. A valve suitable for effecting such selective connection is illustrated in Fig. 15a, the hose connection being designated 41, the high pressure air connection 42, the low pressure air connection 43 and the vent or source of vacuum 44.

For restraining the marginal edge portions of the bulkheads and end parts against radial expansion when the air bag 32 is expanded to press the cemented seams closed, there is provided a restraining ring 45 formed of metal and preferably lined with a layer of soft rubber 46 (Fig. 19). Handles 47 may be provided on the ring 45. The tubular body 23 may be pulled within itself through the annular air bag and along the trough 37 by securing a pull line or cable 48 to the nose of the bow part 25 by a tongs T illustrated in Figs. 17 and 18. The tongs may be of conventional construction and as shown comprises pivotal tong arms 49 carrying elongated grip plates 50 at their free ends, and having a lazy tongs linkage 51 of known construction attached to the pull line 48 so that tension on the pull line increases the grip of the tongs on the nose of the bow 25.

A typical operation in which a bow 25 and one or more transverse partitions or bulkheads 26 are secured to a tubular pontoon body 23 will now be described. The tubular body 23, inside out by virtue of the above-described manner of construction or, if otherwise constructed, previously turned inside out, is passed over the supporting structure S with the bow end of the body adjacent the air bag 32 and the marginal edge of the bow end turned back on the body, as illustrated in Fig. 11, to expose outwardly the surface thereof which will become the outer surface in the finished device. Since it is generally desirable that the bow 25 point slightly upward at an angle to the body 23, as shown in Fig. 1, the bow end of the body is disposed at an angle to the body axis, as shown, and the material of the body is folded down in a groove or tuck illustrated at 52 in Fig. 11. The nose 53 of the bow 25 is tucked within and through the annular air bag 32 and is secured to the pull line 48 by the tongs T. This part of the bow 25 that has passed through the air bag 32 and is within the trough 37 of the structure S is right side out, but its rearward marginal edge portion is turned inside out and fitted over and around the peripheral surface of the air bag 32, as shown in Fig. 11. Layers of rubber cement 54 and 55 are applied respectively to the exposed surfaces of the turned back marginal edge portion of the body 23 and to the exposed inner surface of the marginal portion of the bow which surrounds the air bag 32. After partial drying of such cement, a fabric liner 56 is placed over the cement layer 55. Compressed air at a low pressure, which may be four ounces per square inch, is applied to the air bag 32 through the hose 40 to expand the bag and hold the marginal edges in place while they are being fitted in superimposed relation. Then the marginal edge portion of the body 23 is turned over and brought down on and around the liner 56, and is carefully smoothed out and accurately aligned so that the cement layers 54 and 55 are substantially in line with each other on opposite sides of the fabric liner 56 (Fig. 15). The liner 56 is then progressively pulled out from between the cement layers and these layers are swabbed with thinner by passing a cloth or sponge saturated with thinner along between the cement layers just behind the point where the liner 56 is being pulled out. After making sure that the marginal edges of the body and bow are properly aligned in overlapping relation and free from wrinkles, which operation may be completed by pressing the margins together with hand operated tacking rollers of known construction if desired, the restraining ring 45 is placed over the marginal end portion of the body opposite the contacting cement layers 54 and 55 with the rubber ring liner 46 bearing on the body margin (Fig. 12). Then the pressure in the air bag 32 is increased to a high value, such as 40 pounds per square inch, to expand the bow margin tightly against the body margin which is restrained by the ring 45, and the seam or joint is completed. After a short interval of such pressure on the seam, which may be about five minutes, the air bag 32 is collapsed by venting through the hose 40 or connecting the hose to a source of vacuum and the ring 45 is removed. To position the body for the application of a bulkhead, the bow and a part of the body are drawn back axially within the remainder of the body through the air bag 32 and along the trough 37 of the structure S to an intermediate position, one of which is illustrated in Fig. 14. The pulling force is exerted through the pull line 48 and tongs T, the line 48 being pulled by hand or by suitable power operated means (not shown). A layer of cement 57 is applied to the outwardly exposed surface of the body 23 in a strip in line with the periphery of the air bag 32 and, after partial drying, is covered with a fabric liner 56' (Fig. 16). A bulkhead 26, which comprises a cup-shaped or hemispheroidal part of rubberized fabric is then placed with its cylindrical marginal edge 59 over and surrounding the liner 56', a layer 58 of cement being first applied to and partially dried on the inside of the edge 59, as shown (Fig. 16). The air bag 32 may be inflated with low pressure air during this operation and the overlapping margins are aligned and smoothed down as before. The liner 56' is pulled out, the cement layers are swabbed with thinner, the bulkhead margin is pressed or rolled smooth by hand, if necessary, the ring 45 is placed over the bulkhead margin 59, the pressure in the air bag 32 is increased to a high value, and the bulkhead seam is completed, as described above. After firm seating of the seam, the air bag 32 is collapsed, the ring 45 is removed, and the body 23 is drawn further through the structure S to the point where the next bulkhead is to be installed. These operations are repeated until the desired number of bulkheads have been provided, whereupon the body 23 is completely drawn through the annular air bag 32 and thus completely turned right side out. At this point, the pontoon is removed from the structure S.

The stern part 24 may be secured to the otherwise assembled pontoon in any desired manner. As illustrated in Fig. 6, a gap 60 may be left in one of the side seams of the body 23 when it is assembled and the rear end of the body is passed over an annular air bag 32' which passes through the body seam gap 60, as illustrated in Fig. 22. The air bag 32' is carried by a flat ring 33' and side rings 34' similar in all respects to the construction previously described, and is supported by a vertical post 61 having base feet 62.

With the stern end marginal edge 63 of the body 23 surrounding the periphery of the air bag 32', and a layer of partly dried cement on the outside of the margin 63 covered by a fabric liner, the previously cemented marginal edge 64 of the stern 24 is placed over the body margin 63 and a seam is formed in the same manner as that described above in connection with the bow and the bulkheads. The body 23 is then removed from the air bag 32' and the seam gap 60 is closed by conventional manual cementing procedure. The completely assembled pontoon is then preferably inflated and vulcanized.

Although the invention has been described in connection with the assembly of a pontoon, it is to be understood that the invention is not thereby limited, and may be employed in connection with the manufacture or assembly of other elongated flexible tubular bodies as well. For example, the method is useful in the manufacture of the tubular rings or float portions of inflatable life rafts, and other articles of tubular form formed of flexible materials.

We claim:

1. The method of securing a flexible transverse partition across the interior of an elongated flexible tubular body at a point intermediate its ends which comprises drawing one end of an initially inside out elongated flexible tubular body back within and along the remainder thereof until it is partially reversed, sealing the marginal edge of a flexible transverse partition to the outwardly presented inside surface of said tubular body adjacent the point of reversal, and then completing the reversal of the body to a right side out position.

2. The method of making a compartmented elongated tubular device of flexible material having transverse partitions secured across the interior thereof at points spaced longitudinally thereof which comprises forming a tubular body with the surface thereof which will ultimately become its inner surface outermost, successively sealing the marginal edges of each of a plurality of transverse partitions to such outermost surface of said tubular body by first securing one of said partitions to the body adjacent one end thereof, drawing the end of said body with the partition secured thereto axially both within and along the remainder of said tubular body until the point of attachment of the next partition is adjacent the end of the partially reversed body, securing another partition to the body adjacent said partition reversed end, continuing the drawing of said body back within said tubular body and the securing of partitions thereto at spaced distances, and after the last of such partitions is so secured, completing the reversal of the remainder of said tubular body to a right side out condition.

3. The method of making a compartmented elongated tubular pontoon of flexible material having at least one transverse bulkhead secured across the interior thereof at a point intermediate its ends which comprises securing an end closure part to one end of an initially inside out elongated flexible tubular body, inserting said end part back into the interior of the remainder of said tubular body and drawing said end part and the connected end of the body back within and along the remainder of the body so as to progressively turn said body right side out, sealing the marginal edge of at least one flexible transverse bulkhead to the outwardly presented inside surface of said body adjacent the point of reversal, completing the reversal of said body to turn it right side out, and sealing another end closure part to the end of the body last turned right side out.

4. The method of securing a flexible transverse partition across the interior of an elongated flexible tubular body at a point intermediate its ends which comprises drawing one end of an initially inside out elongated flexible tubular body back within and along the interior of the remainder thereof until it is partially reversed to a right side out position, disposing a substantially cup-shaped transverse partition with its marginal cylindrical surface over and in engagement with the outwardly presented inside surface of said body adjacent the point of reversal thereof with a layer of cement between such superimposed surfaces, expanding the portion of said tubular body engaged by the cylindrical surface of said partition radially outward to press such superimposed surfaces together, and drawing the remainder of said tubular body through itself to completely turn it right side out.

5. The method of securing a flexible transverse partition across the interior of an elongated flexible tubular body at a point intermediate its ends which comprises drawing one end of an initially inside out elongated flexible tubular body back within and along the interior of the remainder thereof until it is partially reversed to a right side out position, disposing a substantially cup-shaped transverse partition with its marginal cylindrical surface over and in engagement with the outwardly presented inside surface of said body adjacent the point of reversal thereof with a layer of cement between such superimposed surfaces, restraining the marginal cylindrical surface of said transverse partition against substantial radial expansion, expanding the portion of said tubular body engaged by the cylindrical surface of said partition radially outward to press such superimposed surfaces together, and drawing the remainder of said tubular body through itself to completely turn it right side out.

6. Apparatus for use in making a compartmented elongated flexible tubular device comprising an annular air bag and supporting ring therefor and an elongated rigid cantilever beam supporting said ring and air bag at one end thereof with the plane of the air bag substantially normal to the beam.

7. Apparatus for use in making a compartmented elongated flexible tubular device comprising an annular air bag carried by an annular open ring, at least one elongated beam secured at one end to said ring and extending laterally therefrom in a direction substantially normal to the plane of the ring and parallel to the ring axis adjacent a projection of the ring opening, and a support for said beam adjacent the end thereof remote from said air bag.

8. Apparatus for use in making a compartmented elongated flexible tubular device comprising an annular air bag carried by an annular open ring, a pair of elongated parallel beams respectively secured at one end to substantially opposite points of said air bag ring and extending laterally from said ring in a direction substantially normal to the plane of said ring and parallel to the ring axis adjacent a projection of the ring opening, and a support for said beams and said ring adjacent the ends of said beams remote from said air bag.

9. Apparatus for use in making a compartmented elongated flexible tubular device comprising an annular air bag carried by an annular open ring, a pair of elongated parallel beams respectively secured at one end to substantially opposite points of said air bag ring and extending laterally from said ring in a direction substantially normal to the plane of the ring and parallel to the ring axis adjacent a projection of the ring opening, an elongated trough substantially coextensive with said beams secured to and extending between said beams at one side of a plane through said beams, and a cantilever support for said beams, said trough and said air bag connected to said beams adjacent the ends thereof remote from said air bag.

10. Apparatus for use in making a compartmented elongated flexible tubular device comprising an annular air bag carried by an annular open ring, a pair of elongated parallel beams respectively secured at one end to substantially opposite points of said air bag ring and extending laterally from said ring in a direction substantially normal to the plane of the ring and parallel to the ring axis adjacent a projection of the ring opening, a trough substantially coextensive with said beams disposed at one side of a plane through said beams and connected at its opposite edges to the respective beams, at least one elongated supporting rod secured to said beams and extending on the opposite side of the plane through said beams from said trough and a cantilever support for said beams, trough, supporting rod and air bag secured to said beams adjacent the ends thereof remote from said air bag.

11. Apparatus for use in making a compartmented elongated flexible tubular device comprising means for drawing one end of an initially inside out elongated flexible tubular body back within and along the remainder thereof until it is partially reversed, means for sealing the marginal edge of a flexible transverse partition to the outwardly presented inside surface of said tubular body adjacent the point of reversal, and means for completing the reversal of the body to a right side out position.

References Cited in the file of this patent

UNITED STATES PATENTS

| | | |
|---|---|---|
| 1,603,465 | Hopkinson | Oct. 19, 1926 |
| 1,620,867 | Boyle | Mar. 15, 1927 |
| 2,452,766 | Kolsky | Nov. 2, 1948 |
| 2,522,079 | Winstead | Sept. 12, 1950 |
| 2,613,169 | Cunningham | Oct. 7, 1952 |
| 2,618,014 | Sawyer et al. | Nov. 18, 1952 |
| 2,642,918 | Janowski | June 23, 1953 |